US011764964B2

(12) United States Patent
Sahni (10) Patent No.: US 11,764,964 B2
(45) Date of Patent: Sep. 19, 2023

(54) WHITELISTING CLIENTS ACCESSING RESOURCES VIA A SECURE WEB GATEWAY WITH TIME-BASED ONE TIME PASSWORDS FOR AUTHENTICATION

(71) Applicant: Palo Alto Networks, Inc., Santa Clara, CA (US)

(72) Inventor: Mohit Sahni, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 190 days.

(21) Appl. No.: 17/314,514

(22) Filed: May 7, 2021

(65) Prior Publication Data
US 2022/0360448 A1 Nov. 10, 2022

(51) Int. Cl.
  *G06F 21/00*  (2013.01)
  *H04L 29/06*  (2006.01)
  *H04L 9/32*   (2006.01)
  *H04L 67/02*  (2022.01)
  *H04L 9/08*   (2006.01)

(52) U.S. Cl.
  CPC .......... *H04L 9/3228* (2013.01); *H04L 9/0863* (2013.01); *H04L 9/3271* (2013.01); *H04L 9/3297* (2013.01); *H04L 67/02* (2013.01)

(58) Field of Classification Search
  CPC ... H04L 9/3228; H04L 9/0863; H04L 9/3271; H04L 9/3297; H04L 67/02; H04L 63/0846
  See application file for complete search history.

(56) References Cited

U.S. PATENT DOCUMENTS

| 9,531,758 B2* | 12/2016 | Devarajan | H04L 63/20 |
| 11,418,329 B1* | 8/2022 | Miller | H04L 9/3271 |
| 2016/0241548 A1* | 8/2016 | Kim | H04L 63/0838 |
| 2019/0394189 A1* | 12/2019 | Thirumalai | H04L 63/0838 |

* cited by examiner

Primary Examiner — Lisa C Lewis
(74) Attorney, Agent, or Firm — GILLIAM IP PLLC (57) ABSTRACT

Each tenant of a secure web gateway (SWG) is issued a secret key. A user accesses a unique secret key derived from the tenant's secret key and loads the secret key into an application which generates time-based one time passwords (TOTPs). When the SWG receives a connection request from a client and cannot decrypt the network traffic, the SWG challenges the client request and indicates an authentication scheme to be used. The client obtains user credentials, constructs a response to the challenge based on the authentication scheme, and issues a connection request to the SWG which indicates the response. The SWG determines an expected response based on a locally generated TOTP and the secret key of the corresponding tenant. If the expected response matches the provided response, the SWG authenticates the user, allows the connection request, and whitelists the client for a period longer than the lifetime of the TOTP.

20 Claims, 4 Drawing Sheets

WHITELISTING CLIENTS ACCESSING RESOURCES VIA A SECURE WEB GATEWAY WITH TIME-BASED ONE TIME PASSWORDS FOR AUTHENTICATION

BACKGROUND

The disclosure generally relates to transmission of digital information and to network architectures or network communication protocols for network security.

Systems using two- or multi-factor authentication can utilize one-time passwords (OTPs) generated according to the One-Time Password (OTP) algorithm. The OTP algorithm is implemented to generate password values for user authentication that are valid for a single login session. The Time-Based One-Time Password (TOTP) is an extension of the OTP algorithm, particularly the Hashed Message Authentication Code (HMAC)-based OTP (HOTP) algorithm, which utilizes the current Unix time for generation of password values. As described in the Internet Engineering Task Force (IETF) Request for Comments (RFC) 6238, the TOTP algorithm is a time-based variant of the OTP algorithm which provides enhanced security by generating password values that are valid for short time intervals (e.g., 30 seconds). When a user is authenticated with TOTP, the user and the authenticating/validating server both have access to a shared key. A common technique for providing the shared key to the user is to utilize Quick Response (QR) code scanning, where the shared key is converted to a QR code, displayed, and obtained by the user scanning the QR code (e.g., with a smartphone). A time-based OTP value is calculated both client- and server-side using a time-based counter and the shared key as inputs to the HOTP algorithm, where the time-based counter is calculated based on the current Unix time, the Unix time from which to start counting time steps (e.g., the Unix epoch), and a time step size. If the time-based OTP value provided by the user matches the time-based OTP value determined server-side, the user can be authenticated.

A secure web gateway (SWG) protects users against web-based threats while controlling access to web-based content. SWGs can be delivered as an on-premises or cloud-based service. SWGs differ from firewalls in that SWGs act as proxies for web traffic and inspect traffic at the application layer (i.e., Layer 7). Rather than a user initiating establishment of a connection directly between a client such as a web browser and a web server for accessing web pages, the client instead first connects to the SWG from which the connection to the web server is established. Users may be able to connect to the SWG after authenticating to the SWG. Once a user has authenticated to the SWG, the SWG can determine whether the authenticated user is authorized to access requested resources (e.g., based on organization policies).

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to authenticating users with basic or digest access authentication in illustrative examples. Aspects of this disclosure can be also applied to other challenge-response authentication protocols. In other instances, well-known instruction instances, protocols, structures and techniques have not been shown in detail in order not to obfuscate the description.

Overview

SWGs rely on the ability to decrypt encrypted network traffic (e.g., Hypertext Transfer Protocol Secure (HTTPS) traffic) as part of authenticating users attempting to connect to the SWG because the public Internet Protocol (IP) address of the client from which the connection is initiated that is visible to the SWG may represent multiple clients within a network and their users as a result of network address translation. If the encrypted connection between the client and the SWG cannot be decrypted, such as if the connection is secured using mutual Transport Layer Security (mTLS) or if certificate pinning is being used, the connection to the SWG may be allowed without necessitating that the user authenticate to the SWG. As a result, the SWG becomes an open proxy and may be abused by malicious users accessing the SWG to mask their associated source IP address. To resolve the lack of user authentication for instances in which network traffic sent from a client to the SWG cannot be decrypted, clients associated with legitimate users can be whitelisted by leveraging TOTP values for authenticating the users as described herein. Whitelisting a client refers to allowing connections from the client without challenging the client based on initially authenticating the associated user.

Each tenant of the SWG is issued a secret key from which a user-specific secret key is derived using a key derivation function (KDF). A user can access their derived secret key via a service which authenticates the user prior to distributing the secret key. The user can load the secret key into an application which generates TOTP values based on the secret key. When a client (e.g., a web browser) associated with or used by the user issues a request to connect to a web server via the SWG and the SWG determines that the user is unknown as a result of being unable to decrypt network traffic sent from the client, the SWG sends a challenge to the client with an indication of an authentication scheme which should be used. The client obtains credentials of the user, constructs a response to the challenge based on the designated authentication scheme, and issues a new connection request to the SWG which indicates the response to the challenge. Upon receiving the credentials in the form of the response to the issued challenge, the SWG determines an expected response based on a locally generated TOTP value, the provided username, and the secret key which was issued to the tenant associated with the user based on the username. If the expected response matches the provided response and the client thus obtained a valid TOTP value from the user, the SWG successfully authenticates the user and allows the connection request from the client. The client can then be whitelisted for a period of time longer than the lifetime of the TOTP value based on the client caching the TOTP value and the SWG storing the expected response and/or TOTP value. As a result, subsequent responses constructed by the client and communicated to the SWG will leverage the cached TOTP value rather than repeatedly requesting credentials from the user. The SWG can then validate the challenge responses based on the stored expected response and/or TOTP value to effectively whitelist the client as long as the expected response and/or TOTP value is available for validation of responses communicated from the client.

Example Illustrations

Figure 1:
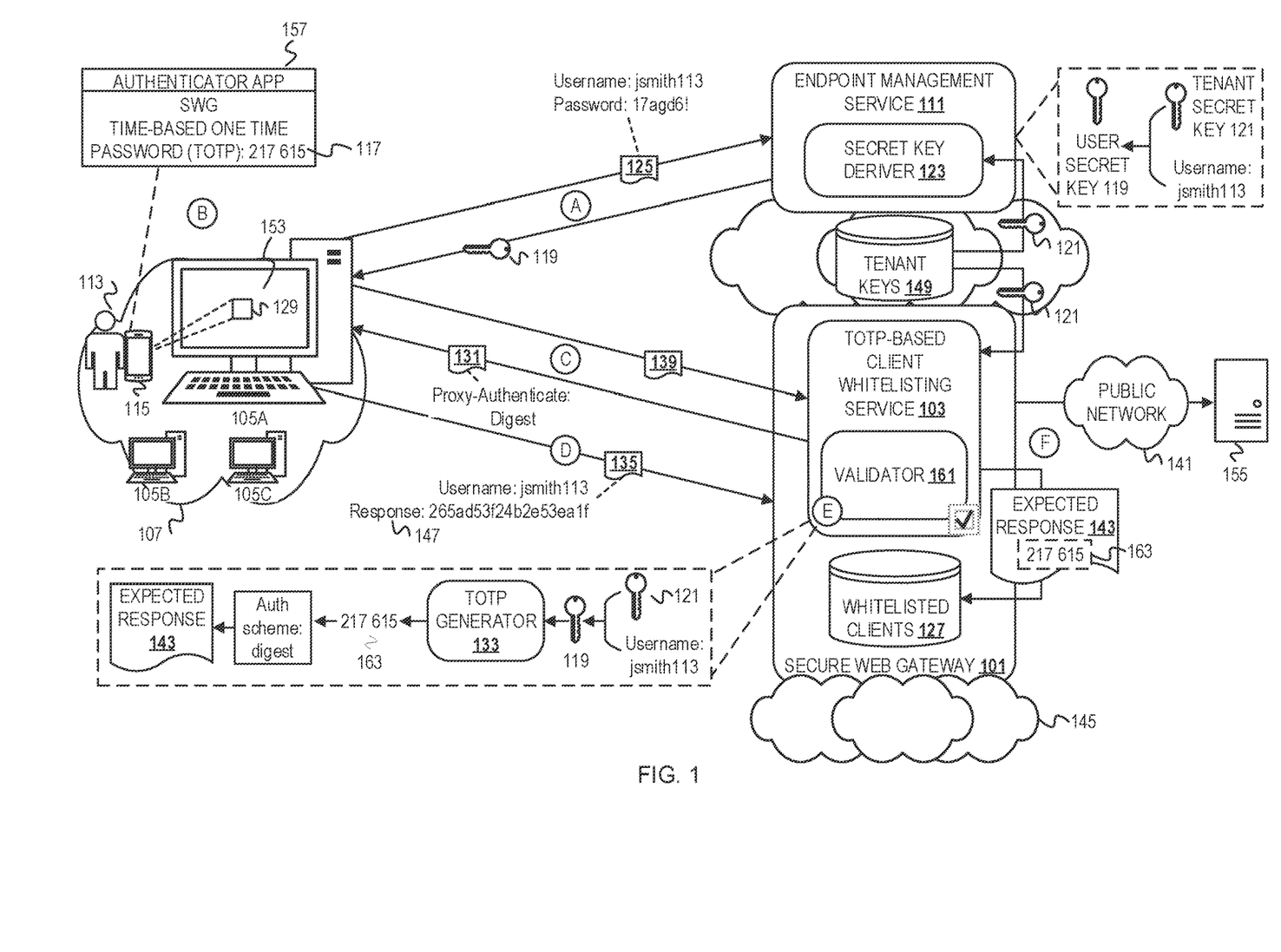
FIG. 1 depicts a conceptual diagram of whitelisting a client connecting to an SWG based on authentication of the associated user with TOTP if network traffic sent from the client cannot be decrypted.

FIG. 1 depicts a conceptual diagram of whitelisting a client connecting to an SWG based on authentication of the associated user with TOTP if network traffic sent from the client cannot be decrypted. An SWG 101, which includes a TOTP-based client whitelisting service ("whitelisting service") 103, and an endpoint management service 111 are delivered as cloud-based services hosted in a cloud 145. In other implementations, the SWG 101 and/or endpoint management service 111 may be on-premises applications. The endpoint management service 111 manages endpoints, or users and devices, for tenants of the SWG 101. The endpoint management service 111 also issues a private key to each tenant of the SWG 101 upon creation of the tenant, which is maintained in a repository 149 of tenant keys. Tenants of the SWG 101 may be organizations using local/private networks, such as an organization using a local network 107 which includes computing devices 105A-C. The SWG 101 acts as a web proxy which forwards client requests originating from the computing devices 105A-C (e.g., from web browsers) to servers such as a web server 155 over the public network 141. Web browsers installed on the computing devices 105A-C thus connect to the web server 155 via the SWG 101.

To connect to the SWG 101, users within the organization represented by the local network 107 should first authenticate to the SWG 101 so that the SWG 101 can verify that the users are authorized to use the SWG 101 for accessing resources over the public network 141. The SWG 101 decrypts network traffic originating from the computing devices 105A-C as part of authenticating users of the computing devices 105A-C. However, the SWG 101 may be unable to decrypt the network traffic in some instances, such as if the connection is secured with mTLS or if certificate pinning is used. FIG. 1 depicts an example in which the SWG 101 determines that network traffic sent from a client 153, which is a web browser installed and running on the computing device 105A, cannot be decrypted.

FIG. 1 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, a user 113 of the computing device 105A obtains a secret key 119 from the endpoint management service 111. The endpoint management service 111 distributes secret keys generated uniquely for individual users within a tenant of the SWG 101. The user 113 logs into a client-facing component of the endpoint management service 111, such as a login portal displayed on a user interface of the computing device 105A, with user credentials including a username and a password, which generates and sends a request 125 to the endpoint management service 111. The endpoint management service 111 receives the request 125 and corresponding credentials and, if the user 113 is successfully authenticated, proceeds with distributing a secret key to the user 113 to facilitate authenticating to the SWG 101. A secret key deriver 123 of the endpoint management service 111 derives secret keys for users based on a corresponding secret key previously issued to the tenant. The secret key deriver 123 retrieves from the repository 149 a secret key 121 which was issued to the tenant corresponding to the local network 107 from which the request 125 was sent, such as based on mapping a username of the user 113 included in the request 125 to an identifier of the associated tenant. The secret key deriver 123 generates a secret key 119 unique to the user 113 based on using the secret key 121 and one or more user attributes, such as the username, group, etc., of the user 113, as inputs to a KDF.

At stage B, the user 113 obtains the secret key 119 to facilitate generation of TOTP values for authenticating to the SWG 101. The endpoint management service 111 can convert the secret key 119 to a QR code 129 representation which is displayed on a user interface of the computing device 105A. The user 113 scans the QR code 129 with a smartphone 115 via an authenticator application 157 installed on the smartphone 115. Scanning the QR code 129 loads the secret key 119 represented by the QR code 129 into the authenticator application 157 for generation of a TOTP value 117 to be used for authenticating to the SWG 101. The authenticator application 157 can implement the TOTP algorithm to generate the TOTP value 117 based on the current Unix time and the secret key 119. The TOTP value 117 is valid for a time interval specified as a parameter value for the TOTP algorithm, such as 30 seconds, and is regenerated upon expiration of this time interval.

At stage C, based on the user 113 requesting access to a web page via the client 153, the client 153 requests that the SWG 101 connect the client 153 to the web server 155. A request 139 communicated from the client 153 to the SWG 101 can indicate a Uniform Resource Locator (URL) which identifies a requested resource stored on the web server 155. For instance, the request 139 may be a Hypertext Transfer Protocol (HTTP) CONNECT request. The request 139 does not include credentials of the user 113. Based on determining that the network traffic sent from the client 153 cannot be decrypted, the whitelisting service 103 of the SWG 101 communicates a response 131 to the client 153 which challenges the client 153 request. The response 131 indicates that the request 139 could not be completed because it lacked authentication credentials. For instance, the response 131 may be an HTTP 407 response. The response 131 also indicates an authentication scheme which should be used for authentication to the SWG 101. In this example, the response 131 indicates that digest access authentication should be used, although the authentication scheme which is utilized for challenging the client 153 request can vary among implementations. The challenge indicated in the response 131 may thus indicate a hash function which the client 153 should use for constructing a response to the challenge based on credentials obtained for the user 113 and additional data specific to the authentication scheme to be used for constructing the response, such as a nonce and opaque.

At stage D, the client 153 issues another request 135 to access the resource of the web server 155 based on obtaining credentials of the user 113. Upon receipt of the response 131 by the client 153, the client 153 may prompt the user 113 to enter credentials (e.g., by displaying a request for input of credentials on a user interface of the computing device 105A) and generates the request 135 after collecting the credentials. The user 113 should have provided the TOTP value 117 as a password value for the credentials to be successfully validated. The request 135 may be an HTTP CONNECT request which includes an HTTP Proxy-Authorization request header. The request 135 includes a username of the user 113 and a response 147 to the challenge issued by the whitelisting service 103. For instance, the client 153 may have constructed the response 147 based on hashing the obtained credentials of the user 113 and the additional data which the whitelisting service 103 had included with the challenge in the response 131 based on the designated authentication scheme to be used for negotiating user 113 credentials.

At stage E, the whitelisting service 103 receives the request 135, which includes the response 147 to the challenge, and validates the response 147. A validator 161 of the whitelisting service 103 validates the response 147 constructed by the client 153 based on locally generating a TOTP value expected to be provided by the user 113 and generating an expected response 143 to the challenge based on the TOTP value. To determine the expected response 143, the validator 161 first derives the secret key 119 of the user 113 from the secret key 121 using the same KDF and user attributes (e.g., username) which the secret key deriver 123 utilized when deriving the secret key 119 which was issued to the user 113 at stage A. The validator 161 retrieves the secret key 121 from the repository 149 based on determining that the secret key 121 was issued to the tenant to which the user 113 corresponds, such as based on determining that the username included in the request 135 is indicated as a member of the organization to which the secret key 121 was issued. The validator 161 uses the secret key 119 as input to a TOTP algorithm implemented by a TOTP generator 133 to generate a TOTP value 163.

The validator 161 generates the expected response 143 based on the TOTP value 163 and the designated authentication scheme. In this example, because digest access authentication was designated, the validator 161 generates the expected response 143 by hashing the TOTP value 163, username provided in the request 135, and the additional data (e.g., the nonce) provided with the challenge issued to the client 153. The validator 161 validates the response 147 provided by the client 153 based on evaluating the provided response 147 against the expected response 143 and determining if the responses match. If the client 153 obtained the TOTP value 117 for the user 113 such that the response 147 was generated based on the TOTP value 117, because the TOTP value 117 matches the locally generated TOTP value 163, the expected response 143 will match the provided response 147 and the user 113 can thus be authenticated.

At stage F, based on the validator 161 validating the response to the challenge provided by the client 153, the whitelisting service 103 whitelists the client 153. The SWG 101 establishes the requested connection between the client 153 and the web server 155 and subsequently forwards requests from the client 153 to the web server 155. The whitelisting service 103 can whitelist connections from the client 153 by caching the expected response 143 and/or TOTP value 163 in a cache 127 maintained for the SWG 101 which comprises indications of clients which have been whitelisted based on the corresponding expected responses/TOTP values. Because the client 153 should also cache the password value, or the TOTP value 117, the client 153 will send subsequent authentication responses to the whitelisting service 103 that are generated based on the cached TOTP value 117. The validator 161 will then validate the response against the expected response 143 and/or a new response generated based on the TOTP value 163, thus allowing the TOTP value 117 and TOTP value 163 to be valid for a longer period of time than was designated as the time interval when they were generated and effectively whitelisting the client 153. The whitelisting service 103 may determine a length of time for which the client 153 should be whitelisted. The whitelisting service 103 may consider one or more parameters in determining the length of time for which the client 153 should be whitelisted, such as a location from which the client 153 issues requests and an identity of the client 153 and/or a tenant with which the client 153 is associated. The length of time may also or instead correspond to a maximum idle time observed for the client 153. Upon expiration of the length of time for which connections from the client 153 are whitelisted, the whitelisting service 103 may remove the expected response 143 and/or TOTP value 163 from the cache 127 so that subsequent requests communicated from the client 153 are challenged and the client 153 should obtain new credentials for the user 113.

Figure 2:
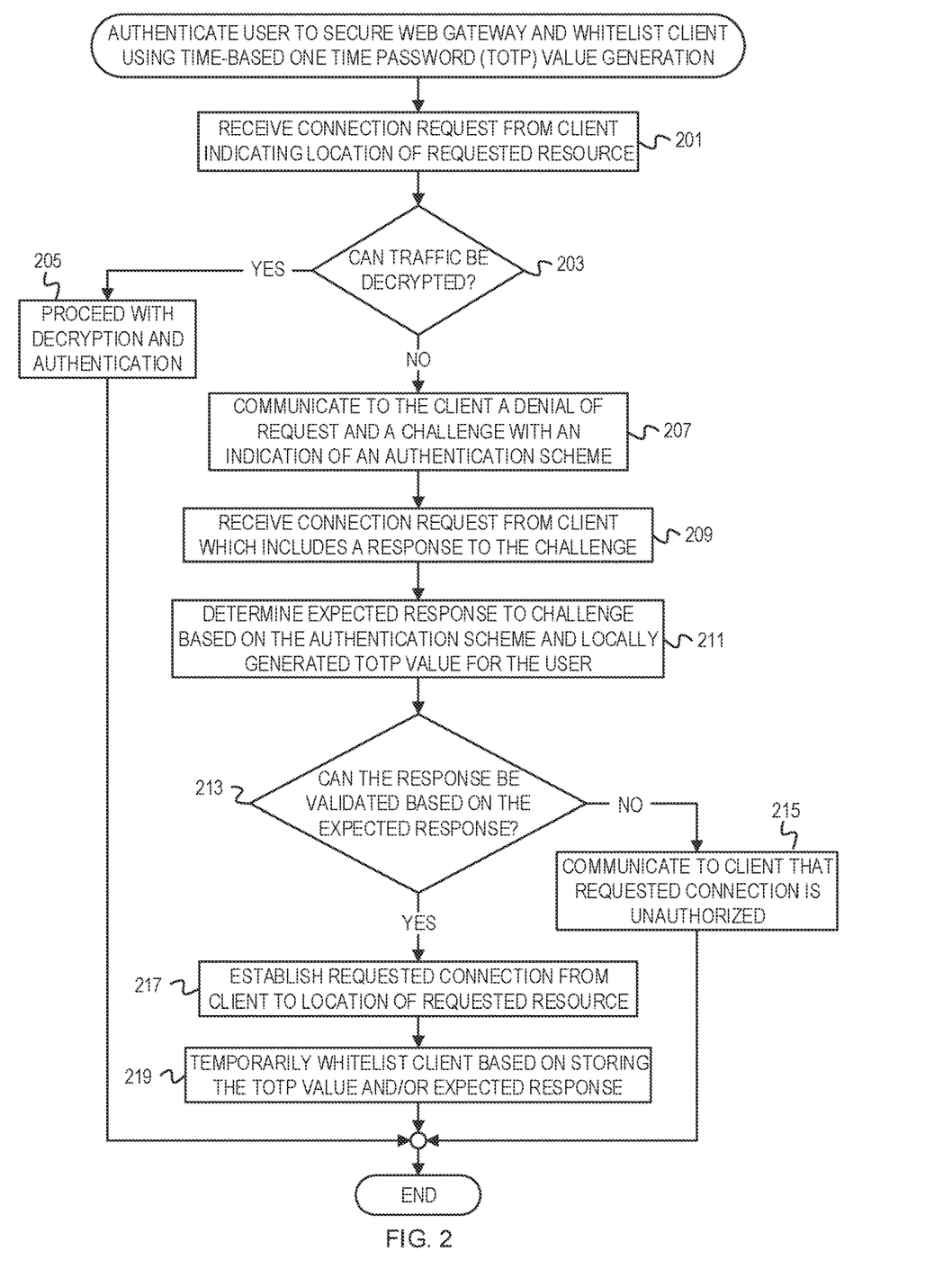
FIG. 2 is a flowchart of example operations for authenticating a user to an SWG and whitelisting an associated client based on TOTP value generation.
Figure 3:
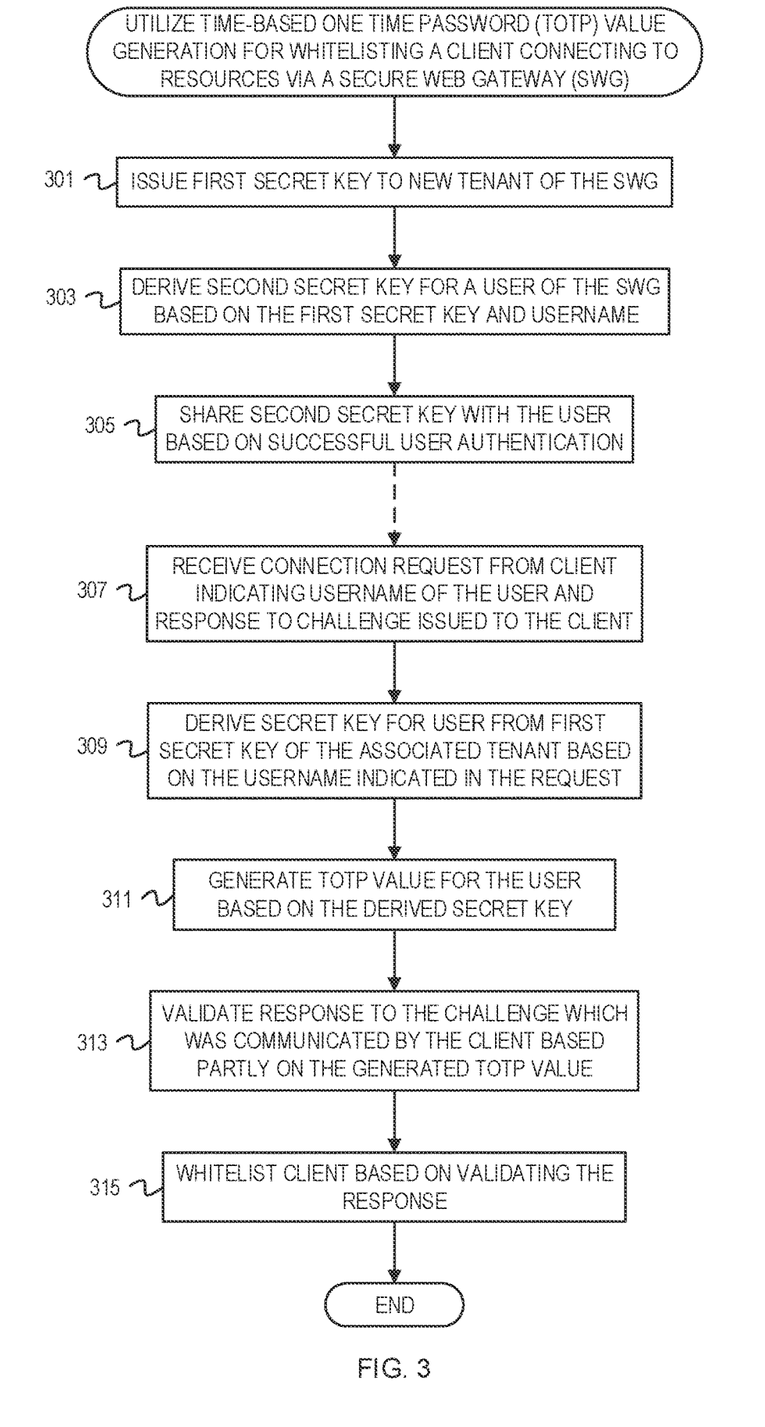
FIG. 3 is a flowchart of example operations for utilizing TOTP value generation for whitelisting a client connecting to resources via an SWG.

FIGS. 2-3 are flowcharts of example operations for whitelisting clients accessing resources via an SWG with TOTPs for authentication of the associated user. The example operations are described with reference to a TOTP-based client whitelisting service (hereinafter simply "the whitelisting service") for consistency with FIG. 1. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for authenticating a user to an SWG and whitelisting an associated client based on TOTP value generation. A TOTP value refers to a password value generated according to the TOTP algorithm. The whitelisting service can execute as part of the SWG to which the user is being authenticated.

At block 201, the whitelisting service receives a connection request from the client which indicates a location of a requested resource. The client may be a web browser by which the user requests access to resources (e.g., web pages), and the location of the requested resource may be a web server. The connection request is a request for the SWG to connect the client to the location of the requested resource. For instance, the request may be an HTTP CONNECT request which includes a URL and a port to which to connect (e.g., an HTTPS port). Subsequently described operations assume that the initial connection request did not include credentials of the user.

At block 203, the whitelisting service determines whether network traffic sent from the client can be decrypted. The whitelisting service decrypts network traffic that is sent from the client over an encrypted connection, such as a connection encrypted using Secure Sockets Layer (SSL)/Transport Layer Security (TLS), in order to authenticate the user and to determine whether the user is authorized to utilize the SWG. In some instances, the whitelisting service may be unable to decrypt the network traffic and thus cannot authenticate the user attempting to access the SWG through the client. Examples of cases in which the network traffic cannot be decrypted include instances where the client is attempting to access resources of an application known to use certificate pinning, where decryption of network traffic has been designated as forbidden based on the type/content of the application to which access is requested (e.g., health care websites), and where the connection initiated from the client is being secured with mTLS or another unsupported version of TLS. The whitelisting service can attempt to decrypt the network traffic or, if the whitelisting service previously received a request indicating the location of the requested resource, can determine whether the associated network traffic was able to be decrypted (e.g., based on whether the whitelisting service stored an indication that network traffic designating that location could not be decrypted). If the network traffic can be decrypted, operations continue at block 205. If the network traffic cannot be decrypted, operations continue at block 207.

At block 205, the whitelisting service proceeds with decryption of the network traffic and authentication. The network traffic is decrypted for authenticating the user and determining whether to connect the client to the requested resource. For instance, upon decryption of the network traffic, the client may be redirected to a service through which the user can be authenticated.

At block 207, the whitelisting service communicates to the client a denial of the request and a challenge with an indication of an authentication scheme to be used. The whitelisting service challenges the client to provide valid credentials by which the user can be authenticated according to the designated authentication scheme. For instance, the whitelisting service may send an HTTP 407 Proxy Authentication Required error status with a Proxy-Authenticate response header which specifies the authentication scheme to the client. The authentication scheme communicated in the response to the client can be any supported authentication scheme, such as basic authentication, digest authentication, etc. The whitelisting service may also include additional data in the response communicated to the client based on the challenge corresponding to the authentication scheme, including an indication of how the client should hash or encode the obtained user credentials. For instance, if the designated authentication scheme is digest authentication, the response can indicate an algorithm/hash function to be used for producing the digest (e.g., MD5) as well as a nonce, opaque, etc.

At block 209, the whitelisting service receives a connection request from the client which includes a response to the challenge. The connection request can again be an HTTP CONNECT request to retry the request to access the resource specified by the included URL. The connection request should also indicate a username and password of the user obtained by the client as a response to the challenge issued by the whitelisting service. The request may be sent with an HTTP Proxy-Authorization header which includes user credentials constructed according to the authentication scheme which was designated. For instance, returning to the example in which digest authentication is used for authentication, the connection request should indicate a response value generated from hashing the username, password, and other data which were communicated to the client based on the algorithm/hash function which was specified for producing the digest. A valid response will have been generated by the client based on a TOTP value generated for the user based on a secret key derived uniquely for the user, where derivation of the secret key is described further in reference to FIG. 3.

At block 211, the whitelisting service determines an expected response to the challenge based on the authentication scheme and a locally generated TOTP value for the user. The whitelisting service locally generates TOTP values for the user which are expected to be supplied for successful authentication to the SWG. The whitelisting service generates the TOTP value for the user based on deriving a secret key for the user. The whitelisting service derives the secret key for the user based on utilizing a secret key previously issued to the associated tenant and the username and/or other user attributes of the user as inputs into a KDF. The KDF by which the whitelisting service derives the secret key of the user from the secret key of the tenant should be the same KDF used for deriving the secret key which was initially provided to the user for client-side TOTP value generation. The whitelisting service uses the derived secret key and the current time (e.g., the current Unix time) as inputs for generating the TOTP value that is unique to the user according to the TOTP algorithm. The whitelisting service can then determine the expected response to the challenge based on the username and TOTP value expected to have been provided by the user and the authentication scheme designated with the challenge. The whitelisting service can also determine the expected response based on the additional data which was included with the challenge issued to the client based on the specified authentication scheme. For instance, the whitelisting service can determine the expected response for a challenge that is based on digest authentication by hashing the username, locally generated TOTP password, nonce, etc. according to a hash function indicated in the challenge.

At block 213, the whitelisting service determines whether the response to the challenge provided by the client can be validated based on the determined expected response. The response from the client and therefore the user credentials can be validated if the response from the client matches the determined expected response because the TOTP values from which the actual and expected responses were constructed should be the same. If the response provided by the client cannot be validated, operations continue at block 215. If the response provided by the client can be validated, operations continue at block 217.

At block 215, the whitelisting service communicates to the client that the requested connection is unauthorized. The whitelisting service communicates to the client that the connection is unauthorized as a result of the service being unable to validate the provided credentials and does not establish the requested connection with the location of the requested resource. The whitelisting service may communicate another 407 Proxy Authentication Required response to the client in order to retry the connection request.

At block 217, the whitelisting service establishes the requested connection from the client to the location of the requested resource. The whitelisting service establishes a connection with the server where the requested resource is located over the port specified in the connection request from the client. The SWG can then forward data sent between the client and the server over the established connection.

At block 219, the whitelisting service temporarily whitelists the client based on storing the expected response and/or the TOTP value. The client can be whitelisted for a period of time that is longer than the period of validity of the TOTP value by storing/caching the TOTP value and/or the expected response which the service generated at block 211. Whitelisting the client refers to storing or caching the expected response and/or TOTP value for a time period longer than the time interval of validity designated for the TOTP value when it was generated. Since the client should also cache the TOTP value obtained for the user, the client will generate responses to subsequent challenges based on that TOTP value. The whitelisting service will therefore validate the generated responses received from the client against the stored expected response that was also generated based on the TOTP value or against a new expected response generated based on the stored TOTP value. The whitelisting service can determine the duration of time for which the client should be whitelisted based on information about the client which is known to the whitelisting service. For instance, the duration of time for which the client should be whitelisted can depend at least partly on the identity of the client, of the tenant associated with the client, and/or a location from which the client requests are being issued. As an example, the whitelisting service may set a longer duration of time during which to whitelist the client if the client is sending requests from a known location and/or if the tenant has a positive reputation based on historical security data, while the set duration of time may be shorter if the client is sending requests from a new location or if the tenant has a less positive reputation. Alternatively or in addition, the duration of time can correspond to a maximum idle time of the client. The duration of time can correspond to a duration of time for which the expected response and/or TOTP value should be cached/stored such that upon expiration of the duration of time, the expected response and/or the TOTP value will expire (e.g., based on removal from storage). Whitelisting a client associated with an authenticated user who is therefore authorized to access the SWG allows for requests issued by the client to continue to go through the SWG without necessitating that the client repeatedly obtain user credentials so that the client can instead utilize the same stored TOTP value for generating subsequent challenge responses, thereby providing for an improved user experience without sacrificing security.

FIG. 3 is a flowchart of example operations for utilizing TOTP value generation for whitelisting a client connecting to resources via an SWG. The example operations refer to an endpoint management service as performing the operations depicted at blocks 301-305 for consistency with FIG. 1. However, the operations performed at blocks 301-305 can be performed by any service which manages tenants of the SWG and that is not necessarily part of the SWG itself, though this service may also be offered as part of the SWG.

At block 301, the endpoint management service issues a first secret key to a new tenant of the SWG. The endpoint management service issues a secret key unique to a tenant of the SWG when the tenant is created, such as upon registration of each tenant with the SWG. The tenant comprises one or more users. As an example, the tenant of the SWG may be an organization, and the SWG can be offered to users within the organization for accessing resources external to the organization (e.g., external to a private network of the organization). The secret key issued to the tenant can be stored in a repository of secret keys that is accessible to the endpoint management service and the whitelisting service and may be indexed by tenant identifiers.

At block 303, the endpoint management service derives a second secret key for a user of the SWG based on the first secret key and a username of the user. The endpoint management service derives the second secret key based on using the first secret key which was issued to the tenant of which the user is a member and the username of the user as inputs into a KDF. Other attributes of the user known to the endpoint management service may also be used as inputs to the KDF, such as user group. The second secret key is thus derived uniquely for the user. The endpoint management service may derive the second secret key for the user at the time of creation of the tenant or based on receiving a request for a secret key from the user.

At block 305, the endpoint management service shares the second secret key with the user based on successful user authentication. Once the user successfully authenticates to the endpoint management service with valid credentials (e.g., a username and password), the endpoint management service can distribute the second secret key to the user. For instance, the endpoint management service can convert the second secret key to a QR code representation that is displayed on a user interface. The user can then access the second secret key based on scanning the QR code which represents the second secret key via an authenticator application to load the second secret key into the authenticator application. The authenticator application can be any application which generates TOTP values for the user based on secret keys to facilitate authentication of the user to applications also having access to a corresponding one of those secret keys.

At block 307, the whitelisting service receives a connection request from a client associated with a user (e.g., a web browser which the user is accessing) which indicates the username of the user and a response to a challenge issued to the client. As described above in reference to FIG. 2, the whitelisting service may have issued the challenge to the client based on previously receiving a connection request from the client which did not include valid credentials. As also described above, the connection request may be an HTTP CONNECT request sent with a Proxy-Authorization header indicating an authentication type and the response which the client generated based on obtained credentials of the user according to the authentication type. For the response to the challenge to be valid, the client should have obtained a TOTP value generated based on the secret key as described at block 305 and generated the response to the challenge based at least partly on the obtained TOTP value and username.

At block 309, the whitelisting service derives a secret key for the user from the first secret key of the tenant associated with the user. The whitelisting service can determine the tenant associated with the user based on the provided username for accessing the corresponding tenant secret key. As an example, the whitelisting service may maintain indications of usernames associated with each of the tenant identifiers for which a secret key has been issued and stored in the repository of secret keys. The whitelisting service derives the secret key of the user based on utilizing the first secret key and one or more user attributes including at least the username as inputs into a KDF. The whitelisting service should use the same KDF and user attributes including the username which were used for deriving the second secret key from the first secret key at block 303. If the user provided the correct username, the derived secret key should be the same as the second secret key which was derived for the user and utilized for TOTP value generation.

At block 311, the whitelisting service generates a TOTP value for the user based on the derived secret key. The whitelisting service uses the derived secret key and the current time as inputs into the TOTP algorithm for generating a TOTP value. The whitelisting service generates TOTP values for the user locally based on the same parameters as the TOTP values which are generated for the user by the authenticator application (i.e., the current time and the secret key which was derived from the tenant secret key and user attribute(s)). As a result, the TOTP values generated by the whitelisting service and by the authenticator application into which the user loaded the second secret key at block 305 should be the same.

At block 313, the whitelisting service validates the response to the challenge which the client communicated based at least partly on the generated TOTP value. As described above in reference to FIG. 2, the whitelisting service generates an expected value/response based on the designated type of authentication as well as the username provided by the client and the generated TOTP value. For instance, the whitelisting service can generate an expected credential value or expected response by encoding or applying hash function to (e.g., in the cases of basic and digest authentication, respectively) the username and the TOTP value and any additional data which were included with the challenge. The whitelisting service evaluates the response to the challenge provided by the client against the expected response and, if the response matches, validates the response and therefore authenticates the user.

At block 315, the whitelisting service whitelists the client based on validating the response. The whitelisting service whitelists the client such that connection requests from the client are not challenged as long as the client is whitelisted. The service whitelists the client for a determined period of time longer than the lifetime of the TOTP value based on successful validation of the response. For instance, the whitelisting service can whitelist the client until a maximum idle time is observed and/or can determine the time period during which to whitelist the client based on one or more parameters, such as client/tenant reputation and/or identity, location from which the client issues requests, etc. The whitelisting service can whitelist the client by caching the TOTP value that should also be cached client-side so that subsequent challenge responses can be validated against an expected response/value generated based on the cached TOTP value. Alternatively or in addition, the whitelisting service can whitelist the client by caching the expected response/value which was generated for the client so that subsequent challenge responses can be validated against the cached expected response/value.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 217 and 219 can be performed in parallel or concurrently. As another example, embodiments may perform blocks 307 and 311-315 of FIG. 3 without performing the operations represented by the other blocks, and another process or program may derive the secret key for a user. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
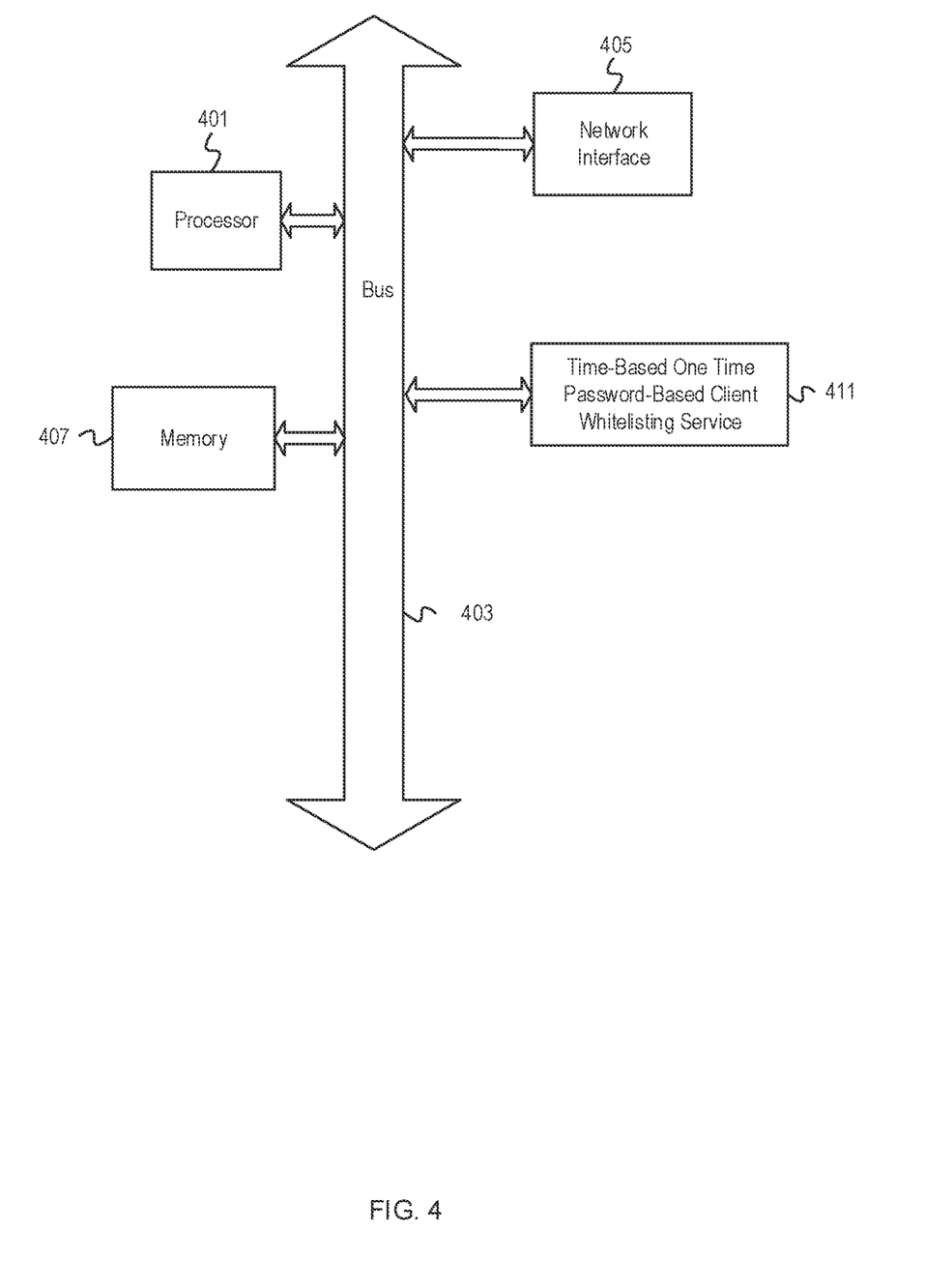
FIG. 4 depicts an example computer system with a TOTP-based client whitelisting service.

FIG. 4 depicts an example computer system with a TOTP-based client whitelisting service. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes TOTP-based client whitelisting service 411. The TOTP-based client whitelisting service 411 whitelists clients connecting to resources via an SWG by validating provided credentials based generation of TOTP values. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for whitelisting a client accessing resources via an SWG with TOTPs for authentication of the associated user as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    based on detecting from a client a request for a connection to a location of a first resource, determining if network traffic from the client can be decrypted;
    based on determining that the network traffic cannot be decrypted, communicating to the client a challenge that indicates an authentication scheme;
    generating a time-based one time password (TOTP) value based, at least in part, on a first secret key for a user associated with the client;
    determining an expected response to the challenge based, at least in part, on the TOTP value and the authentication scheme;
    validating a challenge response from the client against the expected response to the challenge; and
    based on validating the challenge response, whitelisting the client.

2. The method of claim 1 further comprising establishing the connection to the location of the first resource based, at least in part, on validating the challenge response from the client.

3. The method of claim 1, further comprising deriving the first secret key based, at least in part, on inputting a second secret key previously issued to a tenant with which the user is associated and a username of the user communicated by the client into a key derivation function (KDF).

4. The method of claim 3 further comprising generating the TOTP value based, at least in part, on the first secret key and a current time.

5. The method of claim 1, wherein determining the expected response to the challenge comprises hashing or encoding a username of the user and the TOTP value based, at least in part, on the authentication scheme indicated in the challenge.

6. The method of claim 1, wherein validating the challenge response comprises determining that the challenge response from the client matches the expected response to the challenge based on comparing the challenge response and the expected response.

7. The method of claim 1, wherein whitelisting the client comprises storing at least one of the expected response and the TOTP value for a length of time longer than a lifetime of the TOTP value.

8. The method of claim 7, wherein the length of time comprises a maximum idle time of the client.

9. The method of claim 7 further comprising determining the length of time for which to store the at least one of the expected response and the TOTP value based, at least in part, on at least one of an identity of the client, a tenant with which the user of the client is associated, and a location from which the client is requesting to access the location of the first resource.

10. The method of claim 7 further comprising,
    based on detecting from the client a subsequent request for a connection to a location of a second resource while the client is whitelisted and communicating an additional challenge to the client, validating a subsequent challenge response from the client based on the expected response or based on an additional expected response determined based, at least in part, on the TOTP value; and
    establishing the connection to the location of the second resource.

11. One or more non-transitory machine-readable media having program code stored thereon, the program code comprising instructions to:
    based on detection of a request from a client for a connection to a location of a first resource, determine whether network traffic sent from the client can be decrypted;
    based on a determination that the network traffic sent from the client cannot be decrypted, communicate to the client a challenge that indicates an authentication scheme;
    generate a time-based one time password (TOTP) value based, at least in part, on a first secret key derived for a user associated with the client;
    determine an expected response to the challenge based, at least in part, on the TOTP value and the authentication scheme;
    determine whether a challenge response from the client can be validated based, at least in part, on the expected response to the challenge; and
    based on a determination that the challenge response can be validated, whitelist the client.

12. The non-transitory machine-readable media of claim 11, wherein the program code further comprises instructions to establish the connection to the location of the first resource based on a determination that the challenge response can be validated.

13. The non-transitory machine-readable media of claim 11, wherein the program code further comprises instructions to derive the first secret key based, at least in part, on input of a second secret key previously issued to a tenant with which the user is associated and a username of the user communicated by the client into a key derivation function (KDF).

14. The non-transitory machine-readable media of claim 11, wherein the instructions to whitelist the client comprise instructions to temporarily whitelist the client for a first time period, wherein the first time period is a length of time longer than a lifetime of the TOTP value.

15. The non-transitory machine-readable media of claim 11, wherein the client is a web browser, and wherein the location of the first resource is a web server.

16. An apparatus comprising:
a processor; and
a non-transitory computer-readable medium having instructions stored thereon that are executable by the processor to cause the apparatus to,
  based on detection of a request from a client for a connection to a location of a resource, determine if network traffic sent from the client can be decrypted;
  based on a determination that the network traffic sent from the client cannot be decrypted, communicate, to the client, a challenge that indicates an authentication scheme;
  generate a time-based one time password (TOTP) value based, at least in part, on a first secret key for a user associated with the client;
  determine an expected response to the challenge based, at least in part, on the TOTP value and the authentication scheme;
  validate a challenge response received from the client against the expected response to the challenge; and
  based on validation of the challenge response, whitelist the client.

17. The apparatus of claim 16 further comprising instructions executable by the processor to cause the apparatus to connect the client to the location of the resource indicated in the request based, at least in part, on validation of the challenge response.

18. The apparatus of claim 16 further comprising instructions executable by the processor to cause the apparatus to derive the first secret key based, at least in part, on input of a second secret key previously issued to a tenant with which the user is associated and a username of the user communicated by the client into a key derivation function (KDF), wherein the instructions to generate the TOTP value comprise instructions to generate the TOTP value based, at least in part, on the first secret key and a current time.

19. The apparatus of claim 16, wherein the instructions executable by the processor to cause the apparatus to whitelist the client comprise instructions executable by the processor to cause the apparatus to temporarily whitelist the client based, at least in part, on storage of at least one of the expected response and the TOTP value for a first time period, wherein the first time period is longer than a period of validity of the TOTP value.

20. The apparatus of claim 19 further comprising instructions executable by the processor to cause the apparatus to determine the first time period based, at least in part, on at least one of an identity of the client, a tenant with which the user of the client is associated, and a location from which the client issued the request.

* * * * *